US007191660B2

(12) United States Patent
Lopushansky et al.

(10) Patent No.: US 7,191,660 B2
(45) Date of Patent: Mar. 20, 2007

(54) FLAME SHIELD FOR HIGH TEMPERATURE PRESSURE TRANSDUCER

(75) Inventors: Richard L. Lopushansky, Woodlands, TX (US); John W. Berthold, Salem, OH (US)

(73) Assignee: Davidson Instruments Inc., The Woodlands, TX (US)

( * ) Notice: Subject to any disclaimer, the term of this patent is extended or adjusted under 35 U.S.C. 154(b) by 0 days.

(21) Appl. No.: 11/105,877

(22) Filed: Apr. 14, 2005

(65) Prior Publication Data

US 2005/0229709 A1    Oct. 20, 2005

Related U.S. Application Data

(60) Provisional application No. 60/562,375, filed on Apr. 15, 2004.

(51) Int. Cl.
 *G01L 7/08* (2006.01)
(52) U.S. Cl. .................................. 73/715; 73/716
(58) Field of Classification Search .......... 73/700–756; 361/283.1–283.4
 See application file for complete search history.

(56) References Cited

U.S. PATENT DOCUMENTS

| 3,673,443 | A |   | 6/1972  | Siegel           |           |
|-----------|---|---|---------|------------------|-----------|
| 3,857,287 | A |   | 12/1974 | Sonderegger et al. |         |
| 4,061,035 | A |   | 12/1977 | Witzke et al.    |           |
| 4,473,747 | A | * | 9/1984  | Brogardh et al.  | 250/231.1 |
| 4,567,395 | A |   | 1/1986  | Pundarika        |           |
| 4,620,438 | A |   | 11/1986 | Howng            |           |
| 4,703,658 | A |   | 11/1987 | Mrozack, Jr. et al. |        |
| 5,095,741 | A |   | 3/1992  | Bartig et al.    |           |
| 5,168,192 | A |   | 12/1992 | Kosugi et al.    |           |
| 5,257,547 | A |   | 11/1993 | Boyer            |           |
| 5,353,633 | A |   | 10/1994 | Benedikt et al.  |           |
| 5,385,053 | A |   | 1/1995  | Wlodarczyk et al. |         |
| 5,390,546 | A |   | 2/1995  | Wlodarczyk       |           |
| 5,446,279 | A |   | 8/1995  | Hsu              |           |
| 5,488,868 | A |   | 2/1996  | Ootake et al.    |           |
| 5,513,534 | A |   | 5/1996  | Brechbuhl et al. |           |
| 5,706,372 | A |   | 1/1998  | Viduya           |           |
| 5,808,206 | A |   | 9/1998  | Pandorf et al.   |           |
| 6,032,538 | A |   | 3/2000  | Rickman et al.   |           |

(Continued)

FOREIGN PATENT DOCUMENTS

GB    2217846    11/1989

*Primary Examiner*—Edward Lefkowitz
*Assistant Examiner*—Jermaine Jenkins
(74) *Attorney, Agent, or Firm*—McDonald Hopkins LLC; Robert H. Earp, III; David J. Smith

(57) ABSTRACT

Pressure transducers are used to measure pressure under high temperature, hostile environments, including in gas turbine combustors and internal combustion engines. The present a pressure transducer comprises a member having a first end and a second end, a diaphragm sealed within the member at the first end, a sensor sealed within the member at the first end and in operable communication with the diaphragm, a first plate having a plurality of apertures, the first plate being attached to the member at the second end, a second plate having a plurality of apertures, the second plate being attached to the tubular member at the second end and being spaced from the first plate, and wherein the apertures of the first plate are not aligned with the apertures of the second plate.

20 Claims, 3 Drawing Sheets

U.S. PATENT DOCUMENTS

| | | |
|---|---|---|
| 6,131,465 A | 10/2000 | Wlodarczyk et al. |
| 6,167,761 B1 * | 1/2001 | Hanzawa et al. ............. 73/724 |
| 6,284,113 B1 * | 9/2001 | Bjornson et al. ........... 204/453 |
| 6,612,174 B2 | 9/2003 | Sittler et al. |
| 6,736,017 B2 * | 5/2004 | Mansky ................. 73/862.046 |
| 6,860,148 B2 * | 3/2005 | Kossuth et al. ............... 73/159 |
| 6,993,973 B2 * | 2/2006 | Lischer et al. ................ 73/724 |
| 2003/0047004 A1 | 3/2003 | Wlodarszyk |

* cited by examiner

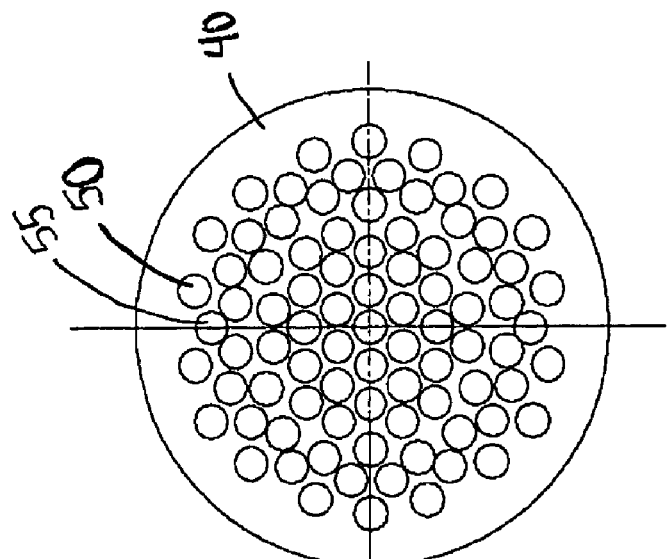
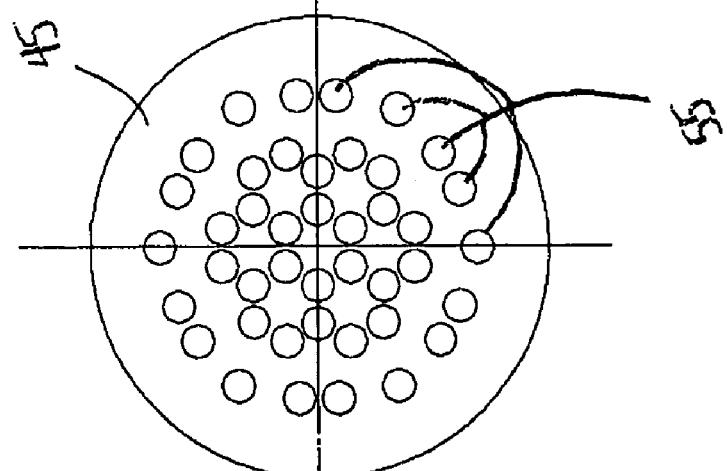
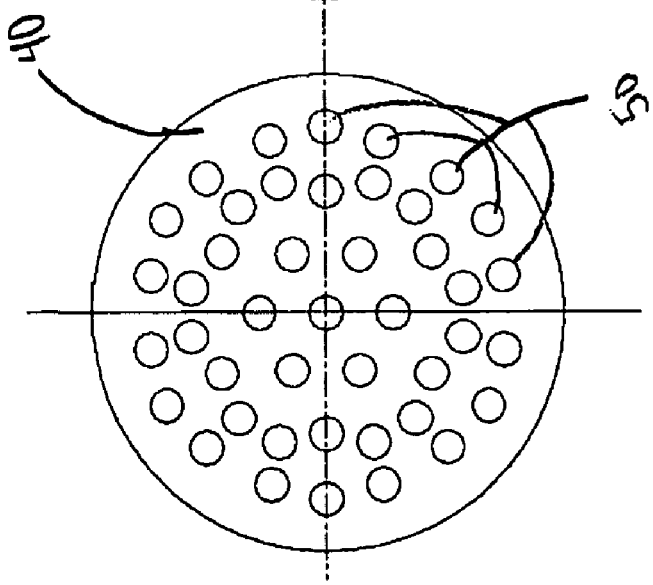
FIG. 3
Aperture Alignment
FIG. 2

FIG. 4

Table 1 Dimensions of First and Second Plates and Apertures

Hole diameters = 0.0055 inch
Plate diameters = .085 inch

| Plate 1 | | | Plate 2 | | |
|---|---|---|---|---|---|
| Ring | Number of Holes | cL Ring Radius (inches) | Ring | Number of Holes | cL Ring Radius (inches) |
| 1 | 1 | 0.000 | 1 | 6 | 0.007 |
| 2 | 6 | 0.012 | 2 | 6 | 0.015 |
| 3 | 6 | 0.022 | 3 | 12 | 0.018 |
| 4 | 12 | 0.024 | 4 | 12 | 0.028 |
| 5 | 18 | 0.033 | 5 | 6 | 0.030 |

FLAME SHIELD FOR HIGH TEMPERATURE PRESSURE TRANSDUCER

CROSS-REFERENCE TO RELATED APPLICATIONS

This application claims priority from U.S. Provisional Patent Application No. 60/562,375 filed on Apr. 15, 2004, which is hereby incorporated by reference.

FIELD OF INVENTION

The present invention relates generally to flame shields for use with pressure transducers, and more particularly, to flame shields used with high temperature pressure transducers in combustion environments.

BACKGROUND

Many applications require pressure measurement in high temperature, hostile environments. These applications include, among others: pressure measurement in gas turbine combustors; and pressure measurement inside the cylinders of internal combustion engines. In both applications, the pressure measurement can be used to help verify desired combustion stoichiometry and proper fuel/air mixing. The pressure measurement can also identify the magnitude of undesirable pressure pulsations in gas turbines and proper spark advance and identification and correction for knock in internal combustion engines.

Present methods to measure pressure in gas turbines and internal combustion engine cylinders are inadequate and unreliable mainly because of the high temperature environment. For example, combustion temperatures generally exceed 2500°F.

Most transducers contain a diaphragm clamped (welded) around the circumference of the body. The center of the diaphragm deflects in proportion to the applied pressure. Various sensors may be used to measure diaphragm deflection, including electronic sensors.

Electronic sensors such as strain gages, capacitance gages, and piezoelectric devices all require lead wires to be bonded to the sensor. The lead wires and sensor materials are dissimilar and over time and over many thermal cycles the wire bonds eventually fail. On the other hand, fiber optic sensors such as Fabry-Perot or microbend may also be configured to measure diaphragm deflection. Fiber optic sensors use glass optical fiber to bring light to the diaphragm and the diaphragm deflection modulates the light signal. These sensors can survive higher temperatures than electronic sensors because no wire bonds are needed.

Nevertheless, the diaphragm material determines the high temperature performance limit of the pressure transducer. High temperature steel alloys such as Inconel or Hastelloy do not maintain their yield strength at combustion temperatures. The modulus of the materials decreases as temperature increases and the cyclic stress-strain characteristics become unrepeatable at high temperatures. The result is unrepeatable diaphragm deflection with pressure, which causes the pressure transducer to be unreliable.

One method to circumvent these problems is to install a tube connected and sealed at one end to the combustion chamber (or engine cylinder) and at the other end to the pressure transducer. The purpose of the tube is to permit the transducer to stand off from the hot zone. In some applications this approach is adequate, but for engines and turbines, the pressure tube may introduce a pressure drop. Additionally, it may attenuate high frequency pressure transients, which are important to measure when pressure pulsations and knock must be detected. Finally, a tube is not a viable solution for an internal combustion engine because the volume of the tube changes the cylinder volume, which in turn affects the combustion conditions and spark timing.

If a pressure transducer with deflecting diaphragm is used in an internal combustion engine, the diaphragm must be protected from transient heating from the flame front during the ignition portion of each pressure cycle. One method for diaphragm protection is disclosed in U.S. Pat. No. 5,385,053 to Wlodarczyk et al. It discloses using a porous metal shield as a cap to cover the diaphragm. The shield conducts heat away from the flame. Because of its porosity, it transmits pressure changes directly to the diaphragm with no time delay or attenuation. However, over long time periods the small pores in the shield will be become coated with carbon and eventually plug, causing it to become ineffective.

The present invention is directed to overcoming one or more of the problems set forth above.

SUMMARY OF THE INVENTION

It is an object of this invention to provide a pressure transducer that comprises a member having a first end and a second end, a diaphragm sealed within the member at the first end, a sensor sealed within the member at the first end and in operable communication with the diaphragm, a first plate having a plurality of apertures, the first plate being attached to the member at the second end, a second plate having a plurality of apertures, the second plate being attached to the tubular member at the second end and being spaced from the first plate, and wherein the apertures of the first plate are not aligned with the apertures of the second plate.

In another embodiment of the present invention, a pressure transducer is provided. The pressure transducer comprises a member having a first end and a second end, a diaphragm sealed within the member at the first end, a sensor sealed within the member at the first end and in operable communication with the diaphragm, a flame shield attached to the second end of the member. Further, the flame shield comprises a first plate having a plurality of apertures located in a predetermined pattern, a second plate having a plurality of apertures located in a predetermined pattern, the second plate being spaced from the first plate, and wherein the predetermined patterns of the apertures of the first and second plates are positioned such that direct impingement of combustion flames onto the diaphragm is prevented.

In yet another embodiment, a method is disclosed. The method comprises providing a member having first and second ends, sealing a diaphragm to the member at the first end, sealing a sensor within the member in operable communication with the diaphragm, attaching a first plate having a plurality of apertures to the member at the second end, attaching a second plate having a plurality of apertures to the member at said second end and spaced from the first plate wherein the apertures of the first plate are not aligned with the apertures of the second plate.

DESCRIPTION OF THE DRAWINGS

Objects and advantages together with the operation of the invention may be better understood by reference to the following detailed description taken in connection with the following illustrations, wherein:

FIG. 2 is a top view of an embodiment of a first plate and a second plate of the flame shield;

FIG. 3 is a top view of an embodiment of the first plate set over the second plate, where a portion of the first plate is ghosted so as to see apertures of both the first and second plates; and FIG. 4 is a table depicting the dimensions of the first and second plates of an embodiment of the present invention, along with the dimensions of the apertures located on such plates.

DESCRIPTION OF INVENTION

Figure 1:
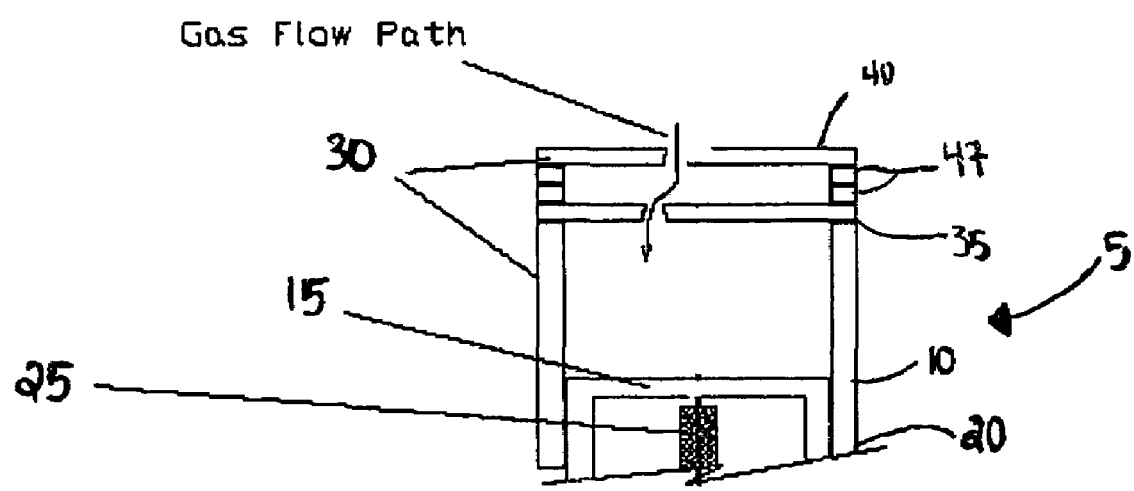
FIG. 1 is a diagrammatic side view of a pressure transducer with a flame shield.

A diaphragm-type pressure transducer that is protected from extreme temperatures in combustion environments by a flame shield is disclosed herein. The flame shield transmits pressure changes directly to the diaphragm without attenuation, while at the same time overcoming plugging problems associated with other devices. An embodiment of the flame shield with the pressure transducer is shown in FIG. 1. In such embodiment, the pressure transducer 5 comprises a member 10, such as the tubular member shown in FIG. 1. It should be understood, however, that such member need not be tubular. It could take a variety of other shapes, such as square, oval, cubed, etc. A diaphragm 15, such as a pressure diaphragm, is sealed within the member 10 at a first end 20 of such member 10. Further, a sensor assembly 25, such as a fiber optic sensor, is sealed within the member 10, such that such sensor assembly 25 is in operable communication with said pressure diaphragm 15 to measure pressure, for example, in gas turbine combustors or inside the cylinders of internal combustion engines. The pressure transducer 5 further includes a flame shield 30 attached to the member 10 at a second end 35 of such member 10. The flame shield 30 prevents direct impingement of combustion flames onto the diaphragm 15, while not affecting the pressure. This allows the pressure transducer 5 to be sealed into a gas turbine combustion chamber or internal combustion engine cylinder and operate normally.

The flame shield 30 includes first and second plates 40, 45 attached to the second end 35 of the member 10. While the first and second plates 40, 45 are shown in the drawings as being circular, it should be understood that other shapes can be used, not just the two shown in FIG. 1. The choice of shape of the first and second plates 40, 45 will correspond to the shape of the member 10 so that the sides of the first and second plates 40, 45 seal against the sides of the member 10. Further, the first and second plates 40, 45 have diameters that are slightly larger than that of the inside diameter of the member 10. This helps create the seal and capture the plates during installation. The first and second plates 40, 45 are spaced from each other by at least one spacer 47, although any number of spacers may be used, not just the two shown in FIG. 1. As shown in FIG. 2, the first and second plates 40, 45 each contain a plurality of apertures 50, 55 located in a predetermined pattern on the first and second plates 40, 45. The apertures 50, 55 may be drilled into the first and second plates 40, 45, or they may also be integrally formed with the first and second plates 40, 45. The first and second plates 40, 45 may be fabricated from ceramics or refractory metals that can survive long-term high temperature exposure. Further, the apertures 50, 55 may be circular, as shown in the drawings, or alternatively they may be non-circular, such as oval or square. Finally, the last ring of the apertures 50, 55 of the first and second plates 40, 45 are adjacent to the inside diameter of the member 10 when the first and second plates 40, 45 are attached to the member 10.

More specifically, the first and second plates 40, 45 each contain a sufficient number of apertures 50, 55 such that the open area of each such plate is approximately between 15% and 25% of the total surface area of such plates. More preferably, the first and second plates 40, 45 each contain a sufficient number of apertures 50, 55 such that the open area of such plates is approximately 20% of the total surface area of such plates. When the first and second plates 40, 45, however, are attached to the tubular member 10, they act as a single plate. Therefore, the open area of the apertures 50, 55 of the first and second plates 40, 45 is approximately between 30% and 50% of the total surface area of one of the plates, as depicted in FIG. 3. For example, as shown in FIG. 2 and as shown in the table of FIG. 4, the first and second plates 40, 45 each have a diameter of approximately 0.085" and each aperture in the plates has a diameter of approximately 0.0055". With a total of 85 apertures in the first and second plates 40, 45, the total surface area of one of the plates out to the edges of the holes in the outermost ring is 0.00466 in$^2$ and the total surface area of the apertures in both plates is 0.002 in$^2$. Therefore, the percent open area is equal to 0.002/0.00466=43%. Larger plates with more apertures or larger apertures can also be used, as well as smaller plates with smaller apertures or fewer apertures. In this configuration, the combined percent open area of the first and second plates 40, 45 is very close to fifty percent, which means that the presence of the plates has little effect on the gas path. The large open also area ensures that the apertures 50, 55 will not plug from fouling or carbon build-up and that the pressure will be transmitted instantly to the diaphragm 15 without attenuation or significant pressure drop.

Further, the first and second plates 40, 45 are spaced apart from each other and positioned such that the apertures 50, 55 of each plate are not aligned, as shown in FIGS. 1 and 3. In other words, no apertures 50 of the first plate 40 align with the apertures 55 of the second plate 45 when assembled. As shown in FIG. 1 this causes the path of the gas to not be a straight line. Having no straight-line path between the outside of the flame shield assembly 30 and the pressure transducer diaphragm 15 ensures that flame will not impinge on the diaphragm 15.

The orifice plates in the flame shield assembly prevent direct impingement of combustion flames onto the diaphragm, but the pressure is unaffected since hot combustion gases are free to circulate to the diaphragm surface. The close spacing and large open area of the orifice plates prevents undesirable pressure drop and ensures that the transducer measures actual pressure. It is desirable to maintain the diaphragm temperature below 1800° F. to ensure that the diaphragm modulus and yield strength do not change sufficiently to affect the repeatability of diaphragm deflection. In the present embodiment, it is possible to choose the spacing between the pressure transducer diaphragm and orifice plate assembly such that the diaphragm temperature never exceeds 1800° F. A plate spacing of 2 to 4 millimeters is normally sufficient.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, we claim:

1. A pressure transducer for a combustion environment comprising:

a member having a first end and a second end wherein the member is positioned within the combustion environment;
a diaphragm sealed within said member at said first end;
a sensor sealed within said member at said first end and in operable communication with said diaphragm;
a first plate having a plurality of apertures, said first plate being attached to said member at said second end;
a second plate having a plurality of apertures, said second plate being attached to said member at said second end and being spaced from said first plate; and
wherein said apertures of said first plate are not aligned with said apertures of said second plate and further wherein the apertures are sized such that the apertures will not foul from product of the combustion environment.

2. The pressure transducer of claim 1, wherein non-alignment of said apertures of said first plate and said second plate prevent direct impingement of combustion flames onto said diaphragm.

3. The pressure transducer of claim 2, wherein said member is capable of attachment to a gas turbine combustor.

4. The pressure transducer of claim 2, wherein said member is capable of being sealed within an internal combustion engine.

5. The pressure transducer of claim 2, wherein said apertures of said first and second plates are drilled in said first and second plates.

6. The pressure transducer of claim 2, wherein said apertures are integrally formed in said first and second plates.

7. The pressure transducer of claim 2, wherein said apertures are substantially circular in shape.

8. The pressure transducer of claim 2, wherein said apertures are non-circular in shape.

9. The pressure transducer of claim 2, further comprising a spacer attached between said first plate and said second plate.

10. The pressure transducer of claim 9, wherein said first and second plates each have a surface area and wherein said apertures of both said first and second plates constitute approximately between 30% and 50% of the surface area of one of said first and second plates.

11. A pressure transducer comprising:
a member having a first end and a second end wherein the member is positioned within a combustion environment;
a diaphragm sealed within said member at said first end;
a sensor sealed within said member at said first end and in operable communication with said diaphragm;
a flame shield attached to said second end of said member, said flame shield comprising:
a first plate having a plurality of apertures located in a predetermined pattern;
a second plate having a plurality of apertures located in a predetermined pattern, said second plate being spaced from said first plate; and
wherein said predetermined patterns of said apertures of said first and second plates are positioned to prevent direct impingement of combustion flames onto said diaphragm.

12. The pressure transducer of claim 11, wherein said apertures of said first plate are not aligned with said apertures of said second plate.

13. The pressure transducer of claim 11, wherein said sensor is a fiber optic sensor.

14. The pressure transducer of claim 11, wherein said member is a tubular member having an inner diameter.

15. The pressure transducer of claim 14, wherein said first and second plates have a substantially circular shape having a diameter that is larger than said inner diameter of said tubular member.

16. The pressure transducer of claim 15, further comprising a spacer attached between said first plate and said second plate.

17. The pressure transducer of claim 16, wherein said first and second plates each have a surface area and wherein said apertures of both said first and second plates constitute approximately between 30% and 50% of the surface area of one of said first and second plates.

18. A method for preventing impingement onto a diaphragm in a combustion environment, the method comprising:
providing a member within the combustion environment, wherein the member has first and second ends;
sealing a diaphragm to said member at said first end;
sealing a sensor within said member in operable communication with said diaphragm; attaching a first plate having a plurality of apertures to said member at said second end; and
attaching a second plate having a plurality of apertures to said member at said second end and spaced from said first plate wherein said apertures of said first plate are not aligned with said apertures of said second plate.

19. The method of claim 18, further comprising preventing direct impingement of combustion flames onto said diaphragm by non-alignment of said apertures of said first and second plates.

20. The method of claim 19, further comprising attaching said member to at least one of an internal combustion engine and a gas turbine combustor.

* * * * *